United States Patent
Putman

(10) Patent No.: US 8,752,694 B2
(45) Date of Patent: Jun. 17, 2014

(54) AUGER HOPPER WITH ENHANCED OVERFLOW TRAPPING ABILITY

(76) Inventor: Keith Putman, Assiniboia (CA)

( * ) Notice: Subject to any disclaimer, the term of this patent is extended or adjusted under 35 U.S.C. 154(b) by 2 days.

(21) Appl. No.: 13/555,265

(22) Filed: Jul. 23, 2012

(65) Prior Publication Data

US 2014/0021010 A1    Jan. 23, 2014

(51) Int. Cl.
- *B65G 33/08* (2006.01)
- *B65G 47/20* (2006.01)
- *B65G 41/00* (2006.01)

(52) U.S. Cl.
CPC ........... *B65G 33/08* (2013.01); *B65G 47/20* (2013.01); *B65G 41/00* (2013.01)
USPC ......... 198/671; 198/311; 198/548; 198/861.1

(58) Field of Classification Search
USPC ................. 198/670, 671, 311, 540, 545, 548, 198/550.1
See application file for complete search history.

(56) References Cited

U.S. PATENT DOCUMENTS

| | | | | |
|---|---|---|---|---|
| 2,630,905 A | * | 3/1953 | Howe | 198/311 |
| 3,035,682 A | * | 5/1962 | Ferch | 198/550.1 |
| 3,080,960 A | * | 3/1963 | Rensch | 198/562 |
| 3,105,586 A | * | 10/1963 | Carew et al. | 198/530 |
| 4,036,411 A | | 7/1977 | Westhoff | |
| 4,117,920 A | * | 10/1978 | Oury | 198/311 |
| 4,220,434 A | | 9/1980 | Letzig | |
| 4,345,680 A | * | 8/1982 | Kay | 198/304 |
| 4,350,241 A | * | 9/1982 | Wenzel | 198/311 |
| 4,540,086 A | * | 9/1985 | David et al. | 198/536 |
| 5,090,550 A | * | 2/1992 | Axmann | 198/313 |
| 5,582,221 A | * | 12/1996 | Smith et al. | 141/250 |
| 7,971,702 B2 | * | 7/2011 | Johnsgaard | 198/550.1 |

FOREIGN PATENT DOCUMENTS

| | | |
|---|---|---|
| CA | 2167655 A1 | 7/1997 |
| CA | 2550414 A1 | 3/2007 |

\* cited by examiner

*Primary Examiner* — Mark A Deuble
(74) *Attorney, Agent, or Firm* — James G. Passe; Passe Intellectual Property, LLC

(57) ABSTRACT

The invention is an auger hopper attachment that can be positioned immediately adjacent a grain hopper outlet to reduce grain loss during transfer. The hopper comprises an adjustable stand that can be used to adjust the vertical position of the hopper to raise it toward the grain hopper outlet.

13 Claims, 2 Drawing Sheets

AUGER HOPPER WITH ENHANCED OVERFLOW TRAPPING ABILITY

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to grain handling equipment. More particularly it relates to hoppers or boots that are used in conjunction with augers to direct grain toward the auger intake.

2. Description of Related Art

It is well known in the art of grain handling to employ powered augers to transport grain from one holding vessel to another for various purposes. For example, augers are regularly used to transfer grain in a truck to a holding bin for storage, or vice versa to enable transport of grain off-site.

However, it is also well known that the use of augers can result in an undesirable degree of grain loss or scatter. Screw-type augers have a relatively narrow, cylindrical intake end which requires immersion in a certain depth of grain to enable uptake of the grain into the auger, but commonly used grain bins are of the hopper style with a downwardly disposed outlet, with the result that grain is often scattered or lost when attempting to direct grain downwardly at the auger intake. Also, wind can cause increased loss due to the distance the grain travels until it is taken up by the auger.

Several solutions have been proposed to address this problem, primarily in the development of hoppers or "boots" that are attached to an auger intake end or receive the auger intake end. For example, U.S. Pat. No. 4,220,434 to Letzig discloses a hopper attachment for an auger that comprises a relatively wide area for receiving grain draining from a bin outlet, which is then funneled toward the auger intake, the concept being that the wide area will help prevent scatter/loss while the funneling effect will provide the grain directly to the auger intake. Numerous prior art solutions are directed to modifying the means by which a hopper engages the ground surface, such as Canadian Patent No. 2,167,665 to Stark, Canadian Patent No. 2,550,414 to Spenceley et al., and U.S. Pat. No. 4,036,411 to Westhoff. However, the vertical distance between the bin outlet and the auger hopper can be significant and the proposed solutions may therefore have little or no substantial impact on the problem of grain loss.

What is needed, therefore, is a means to address the problem of grain loss during transport that reduces the impact of the vertical distance between the bin outlet and the auger hopper.

BRIEF SUMMARY OF THE INVENTION

The present invention accordingly seeks to provide a walled hopper that comprises a ground-engaging adjustable support member that can close the gap between the bin outlet and the hopper and reduce grain loss during transfer.

According to one embodiment of the present invention there is provided a hopper for transferring grain from a storage vessel to an auger, the storage vessel comprising a downwardly disposed outlet and the auger comprising an intake end, the hopper comprising:

a. an auger receiver for receiving the intake end of the auger:
b. a grain receiver for receiving grain from the outlet; and
c. a ground-engaging adjustable hopper support member which is configured to allow vertical adjustment of the grain receiver to enable positioning of the grain receiver adjacent to the outlet.

In yet further exemplary embodiments of the present invention, the grain receiver comprises a device for discharge of the remainder of grain for emptying grain remaining in the grain receiver after operation of the auger, and such remainder discharge device is in one embodiment an openable portal in a bottom surface of the grain receiver. Exemplary embodiments of the present invention further comprise a mesh guard (e.g. as shown in the drawings) for receiving the intake end of the auger, which provides a safety feature that is mandated by law in certain jurisdictions.

A detailed description of exemplary embodiments of the present invention is given in the following. It is to be understood, however, that the invention is not to be construed as being limited to this embodiment.

BRIEF DESCRIPTION OF THE DRAWINGS

The accompanying drawings illustrate exemplary embodiments of the present invention.

Figure 1:
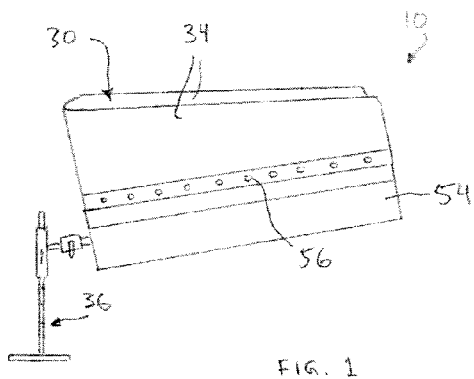
FIG. 1 is a side elevation view of a hopper in accordance with the present invention.

An embodiment of the present invention will now be described with reference to the accompanying drawings.

DETAILED DESCRIPTION OF THE INVENTION

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

The terms "about" and "essentially" mean ±10 percent.

The term "comprising" is not intended to limit inventions to only claiming the present invention with such comprising language. Any invention using the term comprising could be separated into one or more claims using "consisting" or "consisting of" claim language and is so intended.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein a "hopper" is an open container for transferring grain from a storage vessel to an auger. It is usually of a size smaller than the storage container and is sized to match the transfer rate of grain coming from the storage vessel to the auger. One skilled in the art could construct this type of a hopper of the present invention based on the description herein.

As used herein, the "storage vessel" may be a grain bin, a grain truck, or some other means of grain retention as known in the art.

As used herein the "auger" is a screw-type auger of the type used to transfer of grain from one point to another. It has an intake end for receiving grain.

The hopper of the invention comprises three parts; first an "auger receiver" which is a portion of the hopper constructed to receive the intake end of the auger.

In one embodiment of the present invention, the auger receiver comprises a channel for receiving the intake end of the auger. The auger receiver in one embodiment further comprises a sealing gasket material, such as foam, provided in the channel and a strap for securing the intake end of the auger in the channel.

As used herein the "grain receiver" is a portion of the hopper open to receive grain which drops from the storage vessel. The grain receiver in one embodiment comprises a receiving void defined by a bottom surface and a peripheral wall extending upwardly from the bottom surface, and the peripheral wall is in an embodiment configured and adapted to receive the outlet. The storage vessel is of the type that has a gravity feed outlet for removing the grain that is downwardly disposed.

As used herein the ground engaging adjustable hopper "support member" comprises a ground-engaging portion, a vertically-movable portion and securing device for securing the vertically-movable portion in a desired or selected position in relation to the ground.

It is configured to allow vertical adjustment of the grain receiver to enable positioning of the grain receiver adjacent to the outlet to catch grain exiting from the outlet.

In one embodiment the vertically-movable portion comprises an inner passage extending therethrough, the passage is adapted to receive the ground-engaging portion therein, and the securing device comprises a pin for removably securing the vertically-movable portion in the desired or selected position in relation to the ground. The vertically-movable portion is in one embodiment removably mounted on the grain by a mounting device, and the mounting device is adaptable for connection to a standard truck hitch for auger transport when the vertically-movable portion has been disengaged from the mounting device.

Referring now to the accompanying drawings, an embodiment of a hopper according to the present invention is illustrated.

Figure 2:
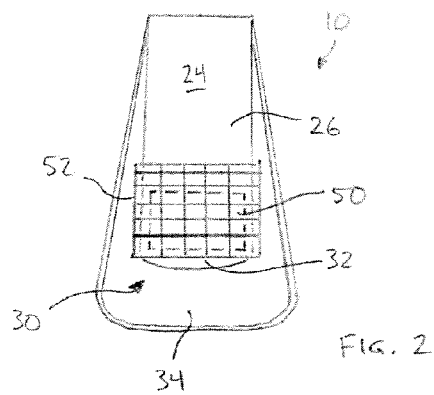
FIG. 2 is a top plan view of the hopper of FIG. 1.
Figure 3:
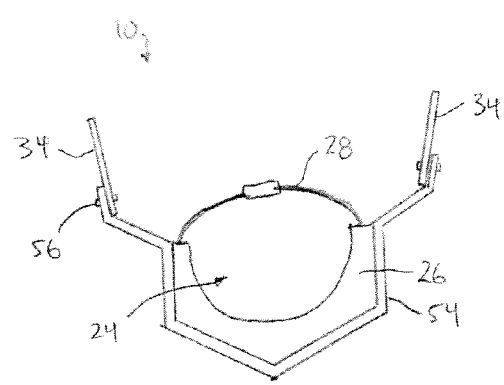
FIG. 3 is a front elevation view of the hopper of FIG. 1.

Referring now in detail to FIGS. 1 to 3, a hopper according to the present invention is indicated by the numeral 10. The hopper 10 comprises a channel 24 for receiving the auger in operation, and the channel is provided with both a foam sealing gasket material 26 and an adjustable strap 28 for holding the auger securely in place when positioned in the channel 24. As can be seen in FIG. 2, a portion of the channel 24 is covered by a steel mesh guard 52, which is welded in place and will house the intake end of the auger during operation.

The hopper 10 also comprises a grain-receiving area 30 which is defined by a bottom surface 32 and a peripheral wall 34 extending upwardly from the bottom surface 32. As can best be seen in FIG. 3, the peripheral wall can be manufactured as a separate piece and attached to the hopper base 54 by means of a fastener 56 such as bolts. While the hopper base 54 is in one embodiment constructed using 16 gauge steel, the peripheral wall 34 can be composed of 2-ply belting.

The grain-receiving area 30 also comprises a portal 50 in the bottom surface 32 (under the mesh guard 52 in FIG. 2) and a hinged door that can be opened to allow discharge of any residual amount of grain that cannot be taken up by the auger.

Figure 4:
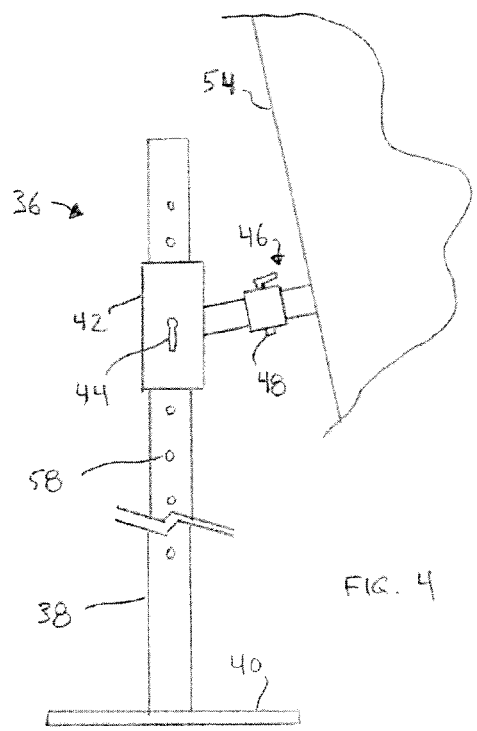
FIG. 4 is a detail elevation view of an adjustable stand.

The hopper 10 also comprises a ground-engaging, adjustable support member 36 which is illustrated in detail in FIG. 4. Although other variations will be obvious to one skilled in the art, the exemplary embodiment is one embodiment that is simple and has strength. In the illustrated embodiment, the support member 36 comprises a ground-engaging portion 38 having a base 40. The ground-engaging portion 38 is provided with holes 58 for receiving a pin 44. The support member 36 further comprises a vertically-movable portion 42, which is a hollow square steel tube that is configured to receive the ground-engaging portion 38 therein. The vertically-movable portion 42 is moved into any desired or selected position along the length of the ground-engaging portion 38 and secured in place by means of the pin 44 which passes through holes in both portions 38, 42.

The vertically-movable portion 42 is also provided with mounting device 46 for mounting the portion 42 on the hopper base 54. This is in one embodiment a selective mounting, as is illustrated, where the mounting device 46 can be disengaged by removing the pin 48. When the vertically-movable portion 42 has thus been disengaged from the hopper base 54, the mounting device 46 can be used to connect to a truck hitch, allowing transport of the auger without removing the hopper 10.

Figure 5:
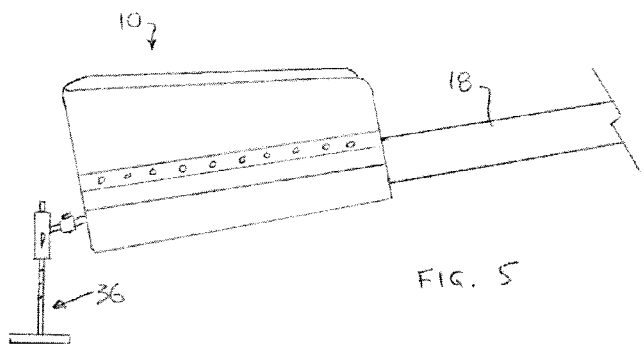
FIG. 5 is a side elevation view of the hopper of FIG. 1 mounted on an auger.
Figure 6:
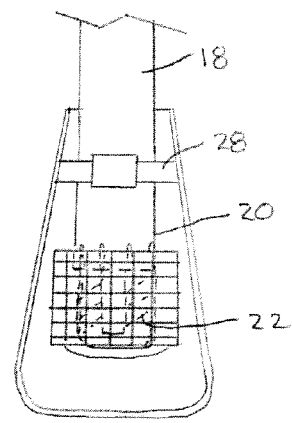
FIG. 6 is a top plan view of the hopper of FIG. 1 mounted on an auger.
Figure 7:
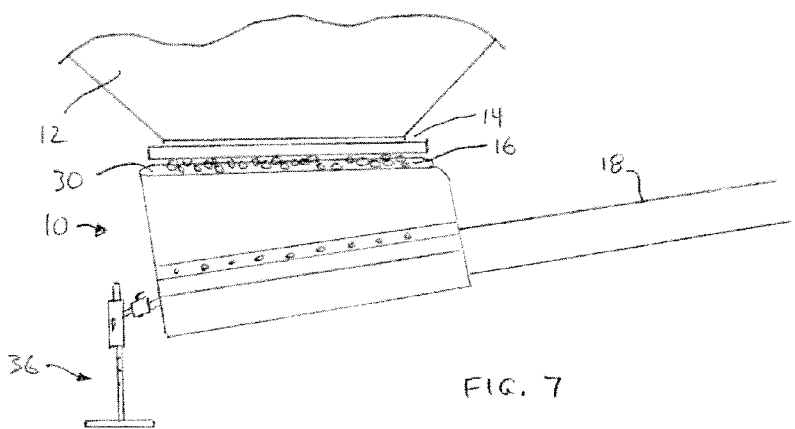
FIG. 7 is a side elevation view showing the hopper supported adjacent the bin outlet.

FIGS. 5 to 7 illustrate the hopper 10 connected to an auger 18. As can be seen in FIG. 6, the intake end 20 of the auger 18 is received in the hopper 10, such that the screw 22 is covered by the mesh guard 52 and the auger 18 is secured in place by means of the adjustable strap 28. FIG. 7 illustrates how the present invention can be used to hold the grain-receiving area 30 in position immediately beneath the outlet 14 of the bin 12. Although the hopper 10 is illustrated as being slightly below the outlet 14 to show the grain 16 falling into the grain-receiving area 30, in practice the hopper 10 may be positioned tightly against the outlet 14 to better avoid grain loss.

As can be readily seen, then, the hopper of the present invention presents significant advantages over the prior art. The hopper can be elevated into contact with the bin outlet to better avoid grain loss or scatter. Also, the support member can be removed to allow towing of the auger with the hopper still attached. Other advantages would be obvious to those skilled in the art.

The foregoing is considered as illustrative only of the principles of the invention. Thus, while certain aspects and embodiments of the invention have been described, these have been presented by way of example only and are not intended to limit the scope of the invention. Indeed, the invention described herein may be embodied in a variety of other forms without departing from the spirit of the invention, which invention is defined solely by the claims below.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A hopper for transferring grain from a storage vessel to an auger, the storage vessel comprising a downwardly disposed outlet and the auger comprising an intake end, the hopper comprising:
    a. an auger receiver for receiving the intake end of the auger;
    b. a grain receiver for receiving grain from the outlet; and
    c. a ground-engaging adjustable hopper support member which is configured to allow vertical adjustment of the grain receiver to enable positioning of the grain receiver adjacent to the outlet;
    wherein the support member comprises a ground-engaging portion, a vertically-movable portion and securing device for securing the vertically-movable portion in a selected position in relation to the ground;
    wherein the vertically-movable portion is removably mounted on the grain receiver by a removable mounting device; and
    wherein the removable mounting device is adaptable for connection to a standard truck hitch for auger transport when the vertically-movable portion has been disengaged from the removable mounting device.

2. The hopper according to claim 1 wherein the storage vessel is a grain bin.

3. The hopper according to claim 1 wherein the storage vessel is a grain truck.

4. The hopper according to claim 1 wherein the auger is a screw-type auger.

5. The hopper according to claim 1 wherein the auger receiver comprises a channel for receiving the intake end of the auger.

6. The hopper according to claim 5 wherein the auger receiver further comprises a sealing gasket material provided in the channel and a strap for securing the intake end of the auger in the channel.

7. The hopper according to claim 1 wherein the grain receiver comprises a receiving void defined by a bottom surface and a peripheral wall extending upwardly from the bottom surface.

8. The hopper according to claim 7 wherein the peripheral wall is adapted to receive the outlet.

9. The hopper according to claim 1 wherein the vertically-movable portion comprises an inner passage extending therethrough, the passage being adapted to receive the ground-engaging portion therein, and the securing means comprises a pin for removably securing the vertically-movable portion in the selected position in relation to the ground.

10. The hopper according to claim 1 wherein the grain receiver comprises a device for discharging the remainder grain for emptying grain remaining in the grain receiver after operation of the auger.

11. The hopper according to claim 10 wherein the device for discharging the remainder grain comprises an openable portal in a bottom surface of the grain receiver.

12. The hopper according to claim 11 wherein the portal is a hinged door.

13. The hopper according to claim 1 further comprising a mesh guard for receiving the intake end of the auger.

\* \* \* \* \*